US006750980B1

United States Patent
Shimura et al.

(10) Patent No.: US 6,750,980 B1
(45) Date of Patent: Jun. 15, 2004

(54) INFORMATION PROCESSING APPARATUS AND OUTPUT APPARATUS

(76) Inventors: Akihiro Shimura, c/o Canon Kabushiki Kaisha 30-2, 3-chome, Shimomaruko, Ohta-ku, Tokyo (JP); Satoshi Nagata, c/o Canon Kabushiki Kaisha 30-2, 3-chome, Shimomaruko, Ohta-ku, Tokyo (JP); Yoshifumi Okamoto, c/o Canon Kabushiki Kaisha 30-2, 3-chome, Shimomaruko, Ohta-ku, Tokyo (JP); Tetsuya Morita, c/o Canon Kabushiki Kaisha 30-2, 3-chome, Shimomaruko, Ohta-ku, Tokyo (JP); Shunya Mitsuhashi, c/o Canon Kabushiki Kaisha 30-2, 3-chome, Shimomaruko, Ohta-ku, Tokyo (JP); Nobuhiko Sato, c/o Canon Kabushiki Kaisha 30-2, 3-chome, Shimomaruko, Ohta-ku, Tokyo (JP); Takanori Nishijima, c/o Canon Kabushiki Kaisha 30-2, 3-chome, Shimomaruko, Ohta-ku, Tokyo (JP); Masaki Unishi, c/o Canon Kabushiki Kaisha 30-2, 3-chome, Shimomaruko, Ohta-ku, Tokyo (JP)

( * ) Notice: Subject to any disclaimer, the term of this patent is extended or adjusted under 35 U.S.C. 154(b) by 0 days.

(21) Appl. No.: 08/923,556

(22) Filed: Sep. 4, 1997

Related U.S. Application Data

(63) Continuation of application No. 08/076,860, filed on Jun. 15, 1993, now abandoned.

(30) Foreign Application Priority Data

Jun. 19, 1992 (JP) .............................................. 4-186358

(51) Int. Cl.$^7$ ................................................ G06K 15/00
(52) U.S. Cl. ....................................... 358/1.15; 358/1.1
(58) Field of Search ................................ 395/114, 112, 395/101, 113; 345/505, 433, 619, 502; 707/515; 358/402, 403, 407, 468, 1.15, 1.13, 1.1, 1.14

(56) References Cited

U.S. PATENT DOCUMENTS

| 5,031,115 A | 7/1991 | Hayashi | ....................... 364/519 |
| 5,075,875 A | 12/1991 | Love et al. | .................. 395/117 |
| 5,333,246 A | * 7/1994 | Nagasaka | .................... 395/133 |
| 5,337,258 A | * 8/1994 | Dennis | ................... 364/551.01 |

FOREIGN PATENT DOCUMENTS

| EP | 0432896 | 11/1990 |
| EP | 0427466 | 5/1991 |
| EP | 427466 | 5/1991 |

OTHER PUBLICATIONS

D. Trowbridge, "VARs Find Dumb Printers Are The Smart Way To Go," Computer Technology Review, vol. 12, No. 5, pp.1, 42 (May 1992).
"New APIs To Enumerate Remote Printer Resources," IBM Technical Disclosure Bulletin, vol. 34, No. 10B, pp. 298–301 (Mar. 1992).

* cited by examiner

*Primary Examiner*—Gabriel Garcia

(57) ABSTRACT

An information processing apparatus which outputs data to an electronic device. Information indicating a data processing ability of the electronic device is first obtained, whereupon data processing means is controlled so as to process the data output to the electronic device depending on the data processing ability indicated by the information so obtained.

43 Claims, 8 Drawing Sheets

INFORMATION PROCESSING APPARATUS AND OUTPUT APPARATUS

This application is a continuation, of application Ser. No. 08/076,860 filed Jun. 15, 1993, now abandoned.

BACKGROUND OF THE INVENTION

1. Field of the Invention

The present invention relates to an information processing apparatus for sending data to an output apparatus such as a printer connected through a bilateral interface, and an output apparatus for receiving data from an information processing apparatus such as a host computer and outputs data in accordance with the input data.

2. Related Background Art

In a recent recording apparatus of this type, output information inputted from a host computer is analyzed to develop bit map data as an output data of a printer engine such as a laser beam printer, and a laser beam modulated in accordance with the developed data is scanned and exposed to a photo-conductor drum to record an image.

A recording apparatus which can output data WYSIWYG-processed (What You See Is What You Get) by a host computer in accordance with page edit data has also been put into practice.

In this case, the recording apparatus may be of a type which develops the bit map data WYSIWYG-processed by the host computer to a bit map memory to output it, or a type which receives data to be rasterized from the host computer, generates output bit map data by a rasterization function of the recording apparatus and develops it in the bit map memory for outputting it.

In the prior art recording apparatus of the type which develops the bit map data WYSIWYG-processed by the host computer to the bit map for outputting it, a time from the start of the bit map development of the output information by the host computer to the start of printing by the printer engine is determined by a rasterization time of the host computer.

Further, in the type which receives the data to be rasterized from the host computer, generates the output bit map data by the rasterization function of the recording apparatus and develops it to the bit map memory for outputting it, the time required for the host computer to transfer the output information to the printer is short but the rasterization time of the recording apparatus itself is long so that information received out of image writing synchronization with the printer engine cannot be correctly recorded.

In the recording apparatus in the field of DTP for page editing by fully utilizing graphics, images and outline font, a demand to shorten the outputting time has been increasing and improvements of a printer control method and a printer control system to meet such a demand has been desired.

SUMMARY OF THE INVENTION

It is an object of the present invention to provide an information processing apparatus for grasping a capability of a printer connected thereto through a bilateral interface and determining a ratio of share to output data, and an output apparatus for processing data in accordance with the ratio information of the share to the data processing received from the information processing apparatus connected thereto through the bilateral interface.

In order to achieve the above object, the present invention provides an information processing apparatus comprising acquiring means for acquiring resource information of a printer connected through a bilateral interface, and determination means for determining a ratio of share to rasterization of information in the data outputted to the printer, to be shared by a rasterizer in the printer.

Further, in order to achieve the above object, the present invention provides an output apparatus comprising receiving means for receiving ratio information of share to rasterize rasterization information in data outputted from an information processing apparatus connected through a bilateral interface, and control means for causing a rasterizer to rasterize the information in accordance with the ratio of share of the rasterization.

Accordingly, the information processing apparatus and the output apparatus can render uniform the resources and the share of the processing capabilities so that a higher processing performance and an efficient operation of the resources are attained.

DESCRIPTION OF THE PREFERRED EMBODIMENTS

Before describing a construction of an embodiment, constructions of a laser beam printer and an ink jet printer to which the embodiment is to be applied are explained with reference to FIGS. 1 to 3. A printer in the embodiment is not to be limited to the laser beam printer or the ink jet printer but it may be other type of printer.

Figure 1:
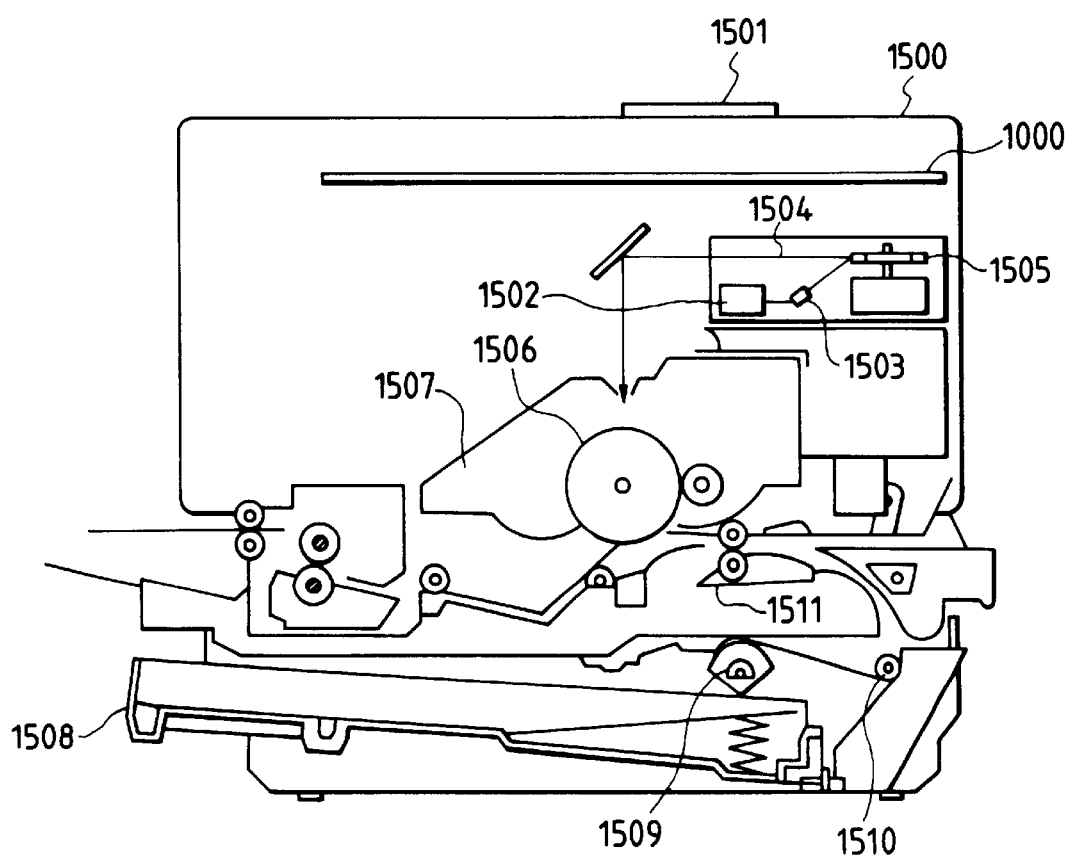
FIG. 1 shows a sectional view of a construction of a first recording apparatus to which the present invention is applied.

FIG. 1 shows a sectional view of a construction of a first recording apparatus to which the present invention is applied. It may be a laser beam printer (LBP).

In FIG. 1, numeral 1500 denotes an LBP main unit which receives print information supplied from an externally connected host computer, stores it, generates a bit map image in accordance with the stored information, and forms an image on a record,sheet which is a recording medium. Numeral 1501 denotes a console panel having console switches and LED displays arranged thereon, and numeral 1000 denotes a printer control unit for controlling the overall LBP main unit 1500 and analyzing the print information supplied from the host computer. The printer control unit 1000 converts the print information to a video signal of the corresponding bit pattern and supplies it to a laser driver 1502, which drives a semiconductor laser 1503, and it turns on and off a laser beam 1504 emitted from a semiconductor laser 1503 in accordance with the input video signal. The laser beam 1504 is laterally swung by a rotating polygon mirror 1505 to scan and expose to an electrostatic drum 1506. Thus, an electrostatic latent image of a character pattern is formed on the electrostatic drum 1506. The latent image is developed by a developing unit 1507 arranged around the electrostatic drum 1506 and then transferred to a record sheet. The record sheet may be a cut sheet, and cut sheet recording sheets are contained in a sheet cassette 1508 mounted in the LBP 1500, and the sheet is taken into the apparatus by a sheet feed roller 1509 and a transport roller 1511, and it is supplied to the electrostatic drum 1506.

Figure 2:
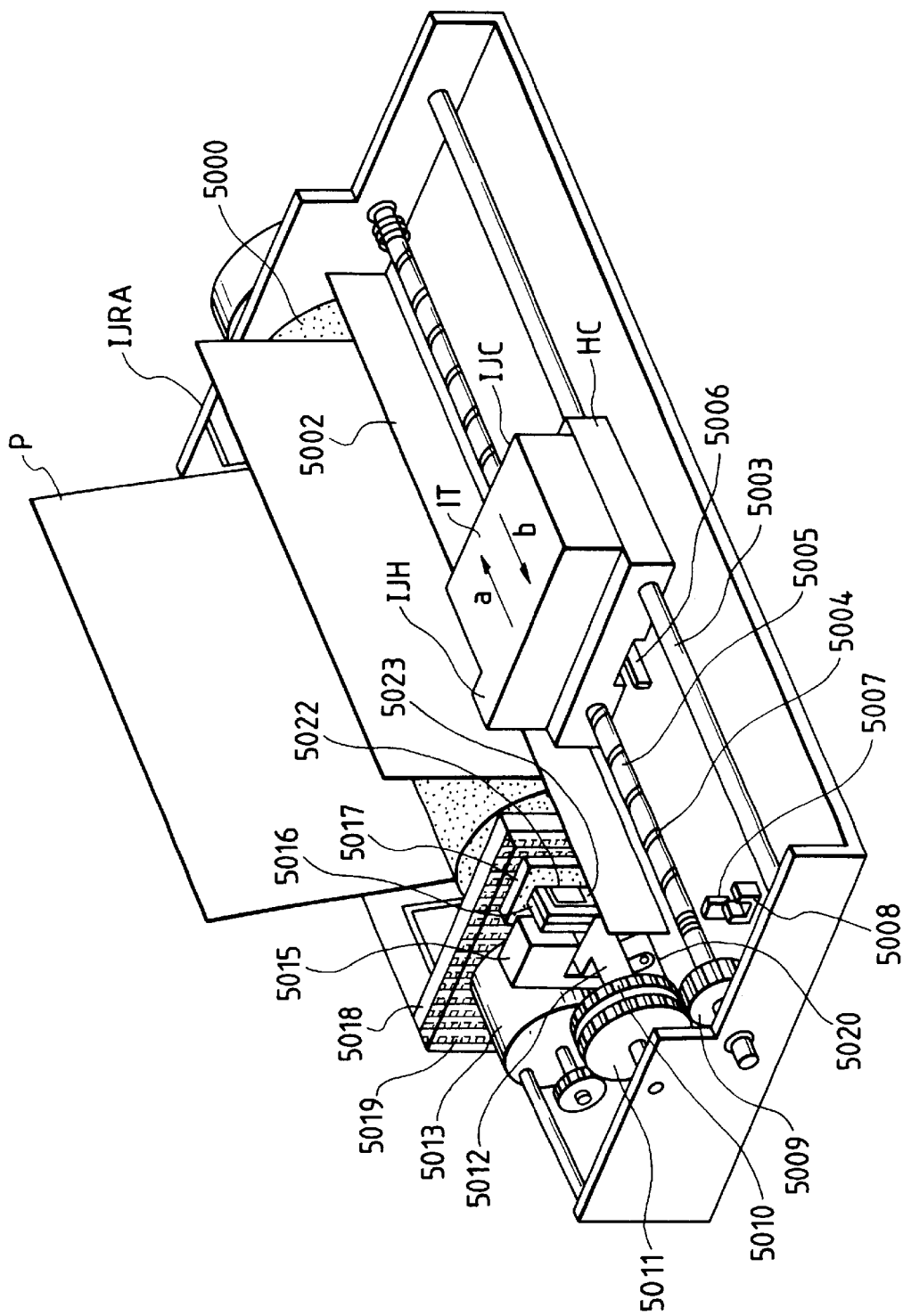
FIG. 2 shows an external view of a construction of a second recording apparatus to which the present invention is applied.

FIG. 2 shows an external view of a second recording apparatus to which the present invention is applied. It may be an ink jet recording apparatus (IJRA).

In FIG. 2, a carriage HC which engages with a helical groove 5004 of a lead screw 5005 rotated by the forward or backward rotation of a drive motor 5013 through drive force transmission gears 5011 and 5009 has a pin (not shown) and it is reciprocally driven in the directions of arrows a and b. An ink jet cartridge IJC is mounted on the carriage HC. Numeral 5002 denotes a sheet retainer plate which presses a sheet to a platen 5000 over the range of movement of the carriage. Numerals 5007 and 5008 denotes photo-couplers which serves as home position detection means for detecting the presence of a lever 5006 of the carriage in the range to switch the direction of rotation of a motor 5013. Numeral 5016 denote a member for supporting a capping member 5022 which caps the entire surface of a recording head, and numeral 5015 denotes suction means for sucking the interior of the cap and it suction-recovers the recording head through an aperture 5023 in the cap. Numeral 5017 denotes a cleaning blade which is movable back and forth by a member 5019. Numeral 5018 denotes a main unit support plate which supports 5017 and 5019. Numeral 5012 denotes a lever for starting the suction of the suction recovery, and it is moved with the movement of a cam 5020 which is engaged with the carriage so that a drive force from the drive motor is controlled by known transmission means such as a clutch.

The capping, cleaning and suction recovery are conducted at the corresponding positions by the action of the lead screw 5005 when the carriage is brought to the home position. It may conduct desired operations at a desired timing.

Figure 3:
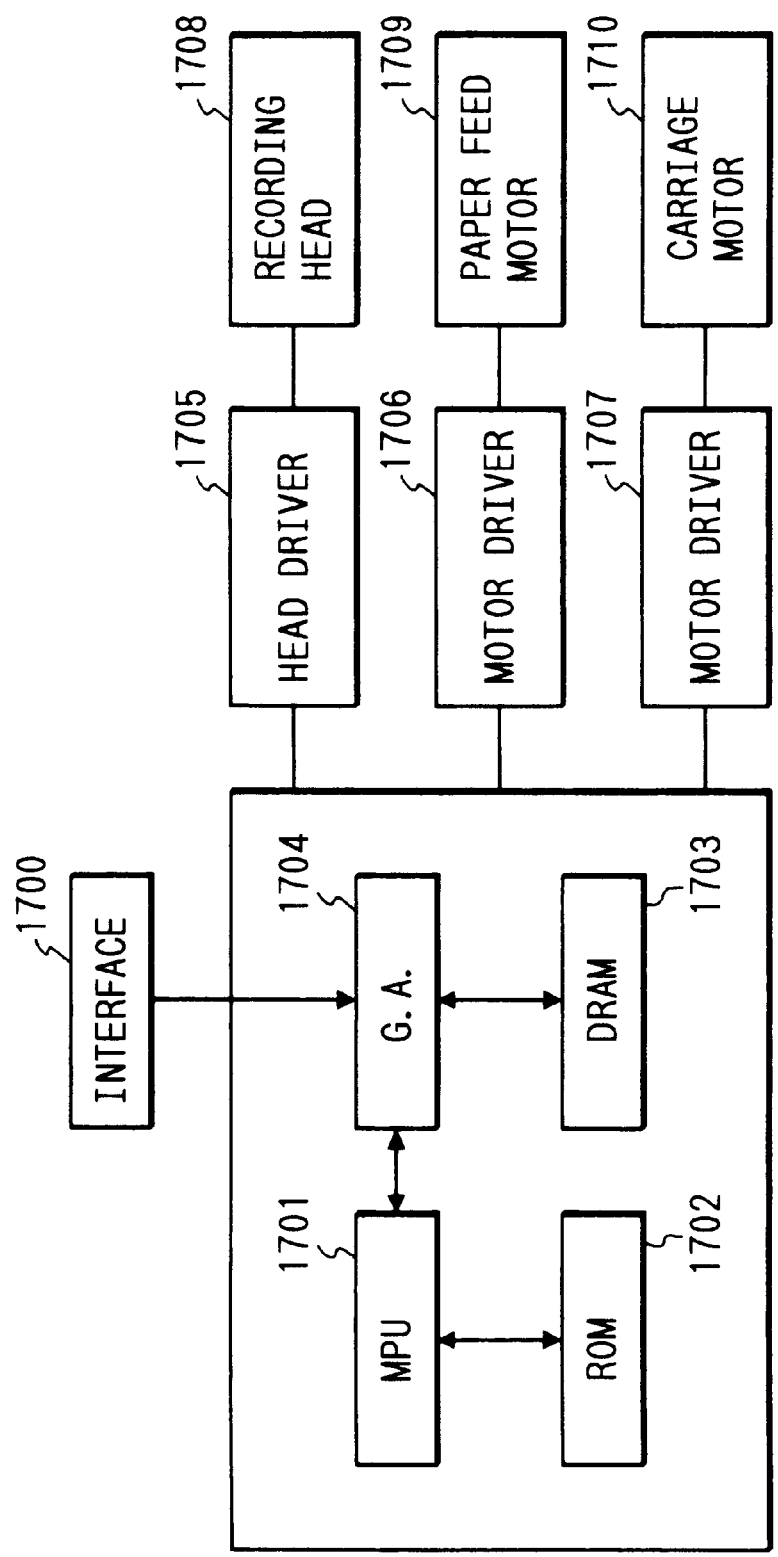
FIG. 3 shows a block diagram of a control unit of the second recording apparatus shown in FIG. 2.

FIG. 3 shows a block diagram of a control unit of the second recording apparatus shown in FIG. 2.

In FIG. 3, numeral 1700 denotes an interface to which a record signal is applied, numeral 1701 denotes an MPU, numeral 1702 denotes a program ROM for storing a control program to be executed by the MPU 1701, and numeral 1703 denotes a DRAM which stores various data (including the record signal record data to be supplied to a head). Numeral 1704 denotes a gate array for controlling the supply of the record data to a recording head 1708, and it also controls the transfer of data among the interface 1700, the MPU 1701 and the DRAM 1703. Numeral 1710 denotes a carrier motor for carrying the recording head 1708, numeral 1709 denotes a transport motor for transporting a record sheet, numeral 1705 denotes a head driver for driving the recording head, numeral 1706 denotes a motor driver for driving the transport motor 1709, and numeral 1707 denotes a motor driver for driving the carrier motor 1710.

In the recording apparatus of the present embodiment, when a record signal is applied from the host computer through the interface 1700, the record signal is converted to print record data by the gate array 1704 and the MPU 1701. The motor drivers 1706 and 1707 are driven and the recording head is driven in accordance with the record data sent to the head driver 1705 to print it out.

Figure 4:
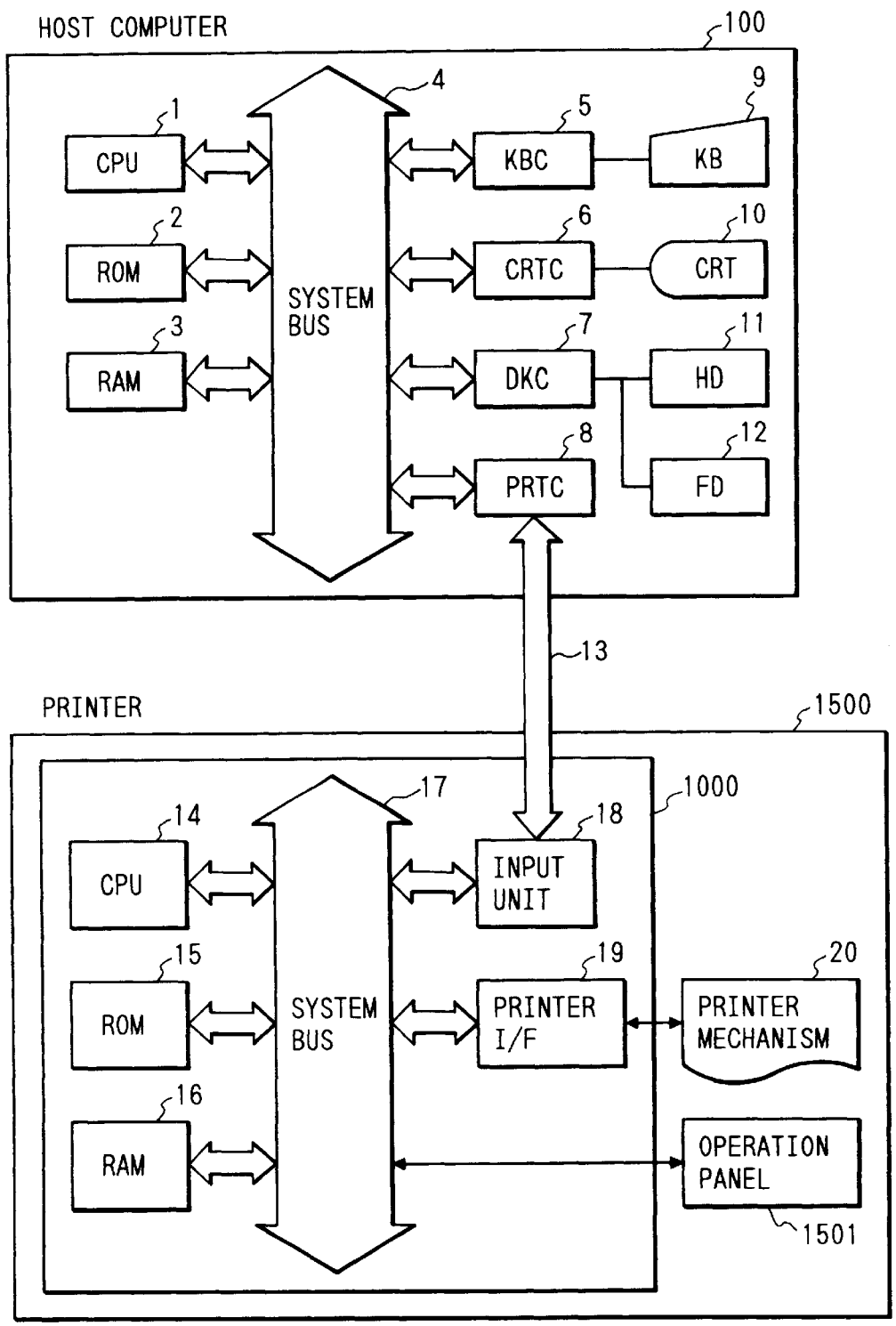
FIG. 4 shows a block diagram of a printer control system in one embodiment of the present invention.

FIG. 4 shows a block diagram of a configuration of a printer control system in one embodiment of the present invention. A laser beam printer (see FIG. 1) is used in the present embodiment.

The present invention may be applied to any system in which process is made through a network such as a LAN, whether it is a single unit system or a multi-unit system.

Figure 6:
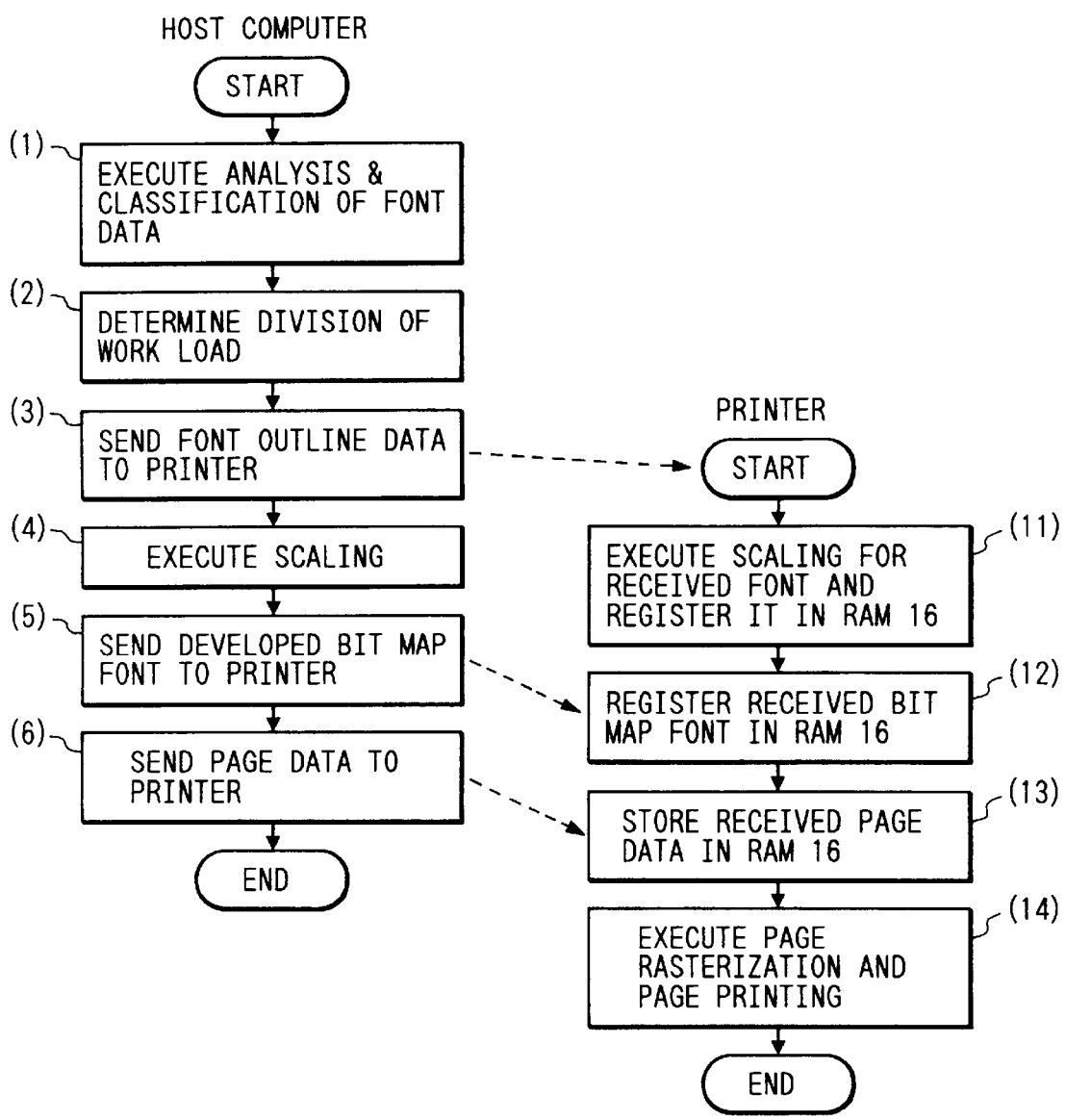
FIG. 6 shows a flow chart of font rasterization parallel processing of the printer and the host computer in one embodiment of the present invention.
Figure 7:
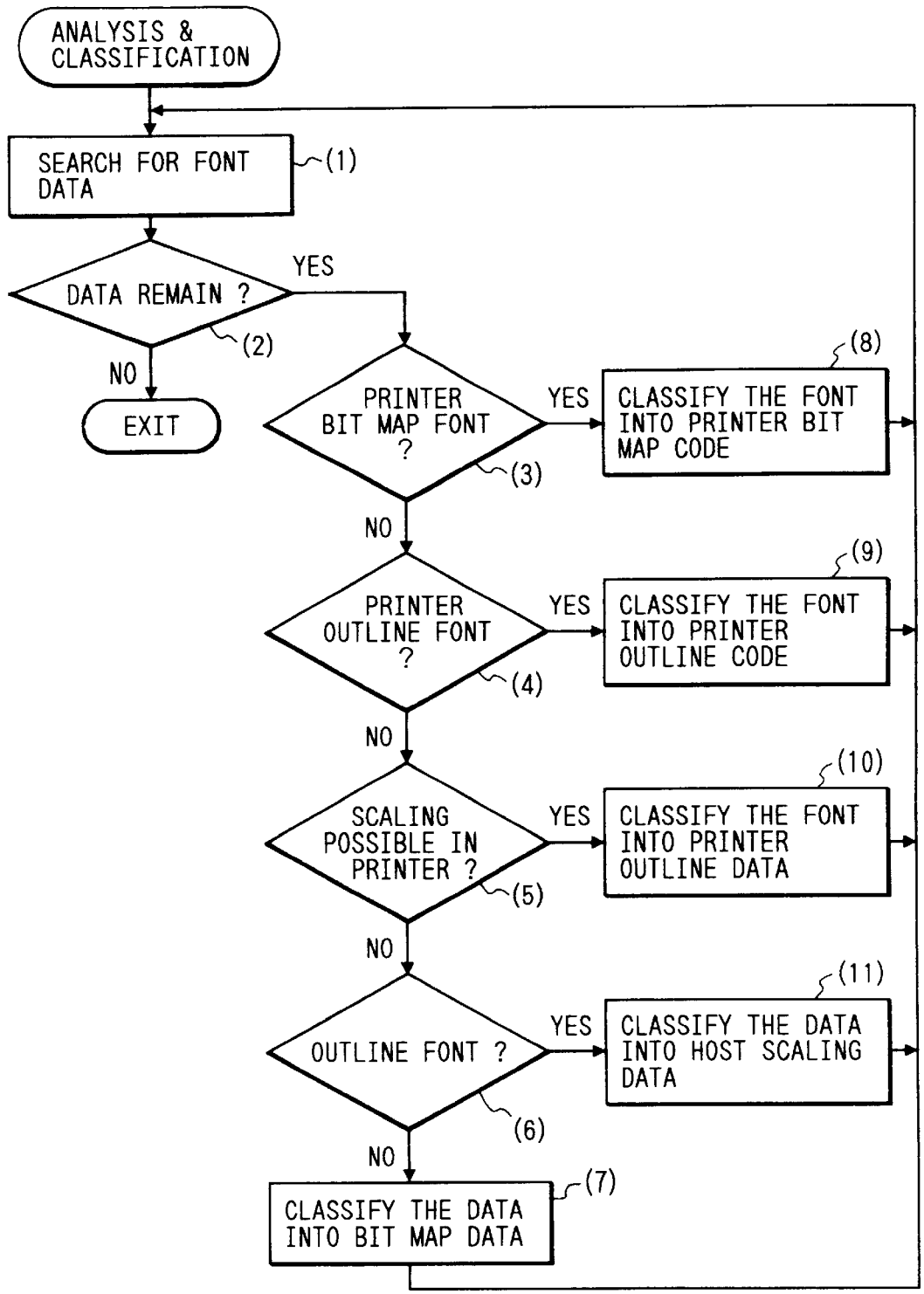
FIG. 7 shows a flow chart of detailed procedure of a font rasterization analysis and classification routine.

In FIG. 4, numeral 100 denotes a host computer which has a CPU 1 for processing a document having mixture of graphics, images, characters and tables (including spread sheets) in accordance with a document processing program stored in a ROM 2, and the CPU 1 centrally controls devices connected to a system bus 4. A control program for the CPU 1 shown in flow charts of FIGS. 6 and 7 is stored in the ROM 2.

Numeral 3 denotes a RAM which functions as a main memory and a work area of the CPU 1. Numeral 5 denotes a keyboard controller (KBC) which controls the key entry from a keyboard 9. Numeral 6 denotes a CRT controller (CRTC) which controls the display of a CRT display (CRT) 10. Numeral 7 denotes a disk controller (DKC) which controls the access of a hard disk (HD) 11 which stores a boot program, various application programs, font data, a user file and an edit file, and a floppy disk (FD) 12. Numeral 8 denotes a printer controller (PRTC) which is connected to the printer 1500 through an interface (bilateral interface) 13 to control the communication with the printer 1500. The CPU 1 may develop (rasterize) an outline font to a display information RAM set on the RAM 3 to permit the WYSIWYG processing on the CRT 10. Further, the CPU 1 may open various registered windows in accordance with a command indicated by a mouse cursor, not shown, to process various data.

The document processing program may be stored in the hard disk 11 or the floppy disk 12 and loaded to the RAM 3 through the DKC 7 for execution.

In the printer 1500, numeral 14 denotes a CPU which centrally controls the access to various devices connected to a system bus 17 in accordance with a control program stored in a ROM 15 and outputs an image signal as print data to a print unit (printer engine) 20 connected through a printer interface 19.

Numeral 16 denoted a RAM which is used as a work area of the CPU 14 and a storage for record information. The RAM 16 may be constructed to be expanded in the memory capacity by an optional RAM connected to an expansion port, not shown.

The printer interface 19 converts the print data to a format compatible to the mechanism of the print unit 20 and outputs it. It may convert parallel data to serial data. A plurality of dot fonts of different sizes and outline font data may be stored in the ROM 15 as printer fonts. A rasterization program for developing outline font or vector graphics data commanded by the host computer 100 to share to a bit map on a rasterization area of the RAM 16, in parallel with the rasterization on the host computer 100 is stored in the ROM 15.

As a result, a ratio of share of the rasterization is dynamically switched in accordance with the analysis of the rasterization information in the output information which is outputted to the printer 1500 by the host computer 100. Depending on the analysis of the rasterization information, one of the printer 1500 and the host computer 100 may conduct the rasterization.

At least one card slot, not shown, may be provided to permit the connection of a build-in font as well as an optional card and a card containing a program for interpreting a different printer control language (an emulation card). An NVRAM which stores printer mode setting information from a console unit, not shown, may be provided.

In the printer control system of the present embodiment, the host computer 100 acquires the resource date from the printer 1500, and when a print job occurs, the CPU 1 analyzes the print job in accordance with the resource data of the printer 1500 to dynamically determine the ratio of share of the parallel processing between the first rasterizer (the function of the CPU 1) and the second rasterizer (the function of the CPU 14), and the second rasterizer or the first rasterizer parallelly processes the rasterization information in the print job in accordance with the determined ratio of share of the parallel processing so that the print job is efficiently processed while the shares to the data processing of the printer and the host computer are rendered uniform.

The CPU 1 analyzes the font size in the print job based on the resource data of the printer to dynamically determine the ratio of share of the parallel processing by the first rasterizer and the second rasterizer so that the host computer and the printer functionally share the rasterization for the specific types of fonts.

The CPU 1 further analyzes the quantity of outline interpolation information in the print job based on the resource data of the printer to dynamically determine the ratio of,share of the parallel processing of the first rasterizer and the second rasterizer so that the rasterization corresponding to the number of interpolations in the outline information is functionally shared by the host computer and the printer.

In the present embodiment, the resource data include resource/processing capability information such as an inquiry to the printer 1500, the presence or absence of a draw function to each draw unit of a line or a circle of the printer by the reference to a definition file on the host computer 100, a draw process time, the presence or absence of the rasterization function of the outline font and a rasterization time, and they are stored in a memory such as the RAM 16. The CPU 1 analyzes all or a portion of those information to dynamically determine the ratio of share of the parallel processing of the first rasterizer and the second rasterizer. The CPU 1 dynamically switches the ratio of share of the parallel processing for each page of the output edit information (characters, graphics, tables and images).

As an example of the analysis of the resource data by the host computer 100, time data required for the printer 1500 to rasterize a predetermined size of outline font is stored in the memory such as the RAM 16 as table data, and when the size of the outline font of the record data is equal to the stored size, the table data is used, and when they are not equal, the table data of the outline font of the record data is corrected to accumulate the rasterization times of the respective characters to determine the ratio of share of the rasterization of the host computer 100 and the printer 1500. In the calculation of the rasterization time, the number of interpolation points (for example, the interpolation by a bezie curve) may be taken into consideration to attain more accurate calculation of the processing time. Further, in the calculation of the rasterization time, where a plurality of languages which can be interpreted by the printer 1500 are provided or the printer has a plurality of resolution powers to record, a plurality of tables for rasterization may be provided in the memory such as the RAM 16 so that the rasterization time is more accurately calculated by taking the differences in the languages and the resolution power into account.

Thus, where there is a font rasterizer (the function of the CPU 14 in the present embodiment) in the printer 1500, the rasterization of the font may be distributed to the host computer 100 and the printer 1500 in accordance with the performances thereof. One font may be transferred to the printer 1500 in the form of bit map to conduct the rasterization by the host computer 100 and the remaining fonts may be transferred to the printer 1500 in the form of outline for the rasterization by the CPU 14.

On the other hand, where the printer 1500 has the data in the form of outline in, for example, the ROM 15, the host computer 100 transfers only the character codes and the attributes thereof to the printer 1500 and quickly terminates the data transfer from the host computer to shorten the time to release the host computer.

In the banding by the printer 1500 in which an overrun may take place if all data are banded by the printer 1500 when the banding of the print data is to be executed in a predetermined memory capacity, a portion or all of the band may be assigned to the host computer 100 to prevent a print error of the printer 1500 due to the variation of the share of the record information processing.

A flow of a print job process of the printer control system of the present invention is now explained with reference to FIGS. 5 and 6.

Figure 5:
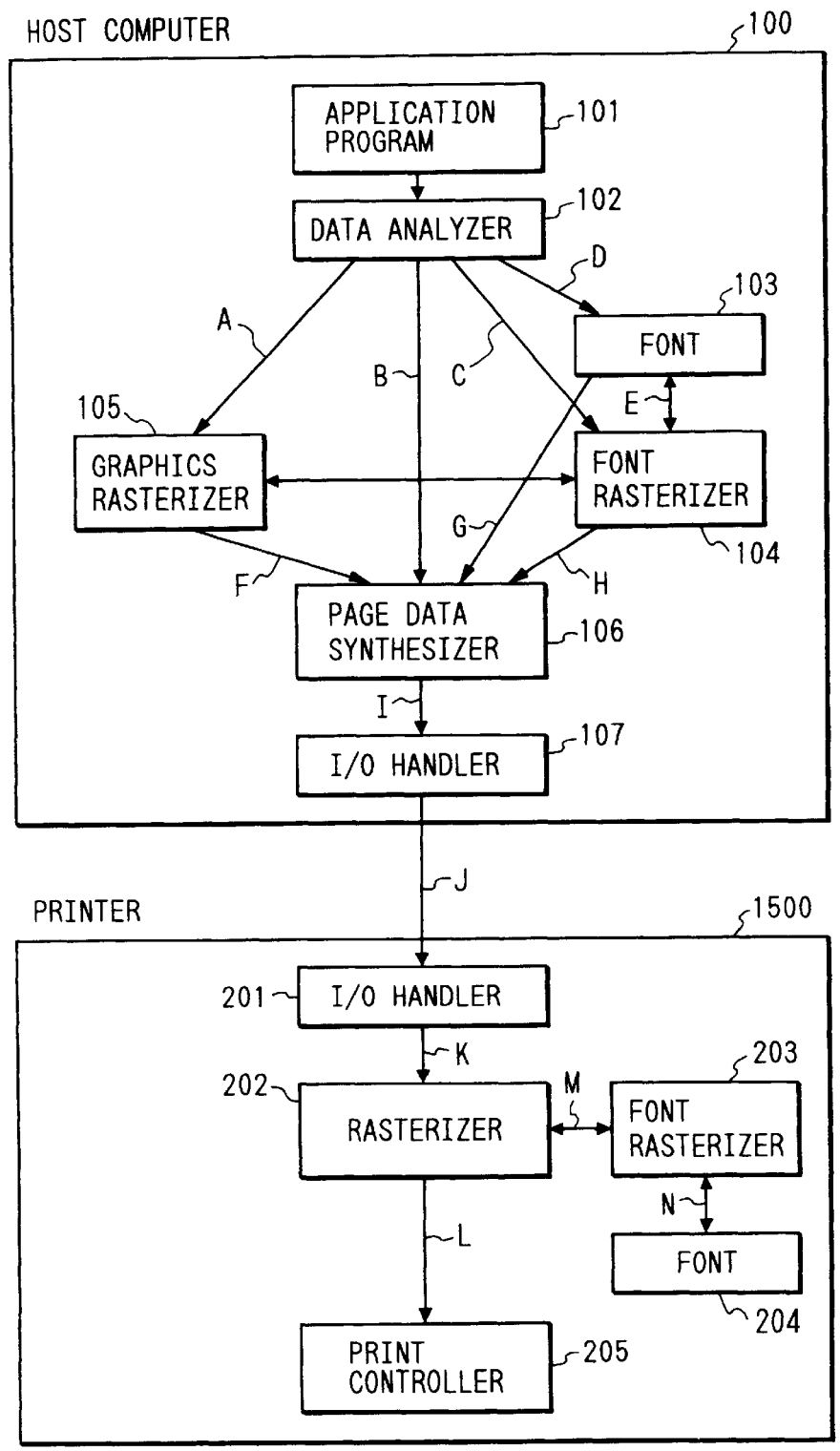
FIG. 5 shows a diagram of a data processing path between a printer and a host computer.

FIG. 5 shows a diagram of a data process path between the printer 1500 and the host computer 100 shown in FIG. 4.

In FIG. 5, numeral 101 denotes an application being executed, which may be a DTP processing program. Numeral 102 denotes a data analyzer which analyzes a print job for each page, classifies it to an outline font or the like (see FIG. 7 to be explained later), determines the share of the rasterization, and directs data to be processed to the font 103, a font rasterizer (which functions as a first rasterizer) 104, a graphics rasterizer (which functions as the first rasterizer) 105 and a page data generator 106, which combines output data from the data analyzer 102, the graphics rasterizer 105, the font 103 and the font rasterizer 104.

Numerals 107 and 201 denote input/output handlers which control the input/output of the printer 1500 and the host computer 100. Numeral 202 denotes a rasterizer which develops the rasterized data to a bit map. Numeral 203 denotes a rasterizer which rasterizes a font by referring a memory 204 which stores the outline data by referring the received outline font or based on the received character codes. Numeral 205 denotes a print control unit which controls the transfer of the bit map data outputted from the rasterizer 202 to the print unit 20 (see FIG. 4). A-N denote data process paths.

As shown in FIG. 5, where it is determined by the print job by the data analyzer 102 that there are rasterizer 202 and font rasterizer 203 in the printer 1500, the rasterization of the font may be distributed in accordance with the performances of the host computer 100 and the printer 1500, and one font may be processed by the rasterization by the host computer 100 and transferred to the printer 1500 (paths C-H-J-K) in the form of bit map and the remaining fonts may be transferred (paths D-G-J-K) to the printer 1500 in the form of outline for the rasterization by the font rasterizer 203.

FIG. 6 shows a flow chart of a rasterization parallel process of the printer 1500 and the host computer 100 shown in FIG. 4. Numerals (1) to (6) denote steps of the host computer 100, and numerals (11) to (14) denote steps of the printer 1500. When the rasterization is assigned to the printer 1500 by the step (3), the shift to the step (3) and the steps (11) to (14) are parallelly processed to parallelly process the font rasterization.

Analysis and classification routine of the font data in the print job is executed (1) in accordance with the flow chart shown in FIG. 6 to determine the share of processing in accordance with the processing capability (2). Where the rasterization to the printer 1500 has been decided, the outline data of the font or the character code of the outline font is sent to the printer 1500 (3). As a result, the process of the step (11) is parallelly started. The process by the host computer 100 is described below.

The rasterization (scaling) on the font data assigned to the host computer 100 is executed (4), and the developed bit map font is sent to the printer 1500 (5). As a result, the process of the step (12) is simultaneously started.

The page data is then sent to the printer-1500 (6), and the process is terminated.

On the other hand, when the font data assigned from the host computer 100 is received in the step (3), the received font is scaled (rasterized) and it is registered in the RAM 16 (11).

On the other hand, when the bit map data is received from the host computer 100 in the step (5), the received bit map data is registered in the RAM 16 (12).

On the other hand, when the page data is received from the host computer 100 in the step (6), the received page data is stored in the RAM 16 (13), and the rasterizer 202 page-rasterizes it by referring the data in the RAM 16 and transfers the page-rasterized printer data to the print control unit 205 (14), and the process is terminated.

In this manner, the host computer acquires the resource data of the printer, analyzes the print job in accordance with the resource data, and determines the ratio of share of the rasterization of the printer and the host computer to the rasterization information of the print job, and the host computer and/or the printer parallelly rasterizes the information extracted from the print job in accordance with the determined ratio of share of the rasterization so that the shares of the rasterization of the information by the printer and the host computer are rendered uniform. The resource data processing program which the host computer 100 analyzes need not be stored in the ROM 2 if it is stored in the hard disk 11 of the host computer 100 or by the floppy disk 12 and can be executed by the print driver.

FIG. 7 shows a flow chart of a detail of the font rasterization/analysis/classification routine shown in FIG. 6. Numerals (1) to (11) denote steps.

When a print job is generated by an application program, the data analyzer 102 searches the font data of the print job (1) to determine whether the data still exists or not (2), and if the decision is NO, the process is terminated, and if the decision is YES, whether the searched data matches to the bit map font of the printer 1500 or not is determined (3). If the decision is YES, the font is classified to the bit map code of the printer 1500 (8), and the process returns to the step (1).

On the other hand, if the decision in the step (3) is NO, whether the searched data matches to the outline font in the printer 1500 or not is determined, (4), and if the decision is YES, the font is classified to the outline code of the printer 1500 (9), and the process returns to the step (1).

On the other hand, if the decision in step (4) is NO, it is determined whether scaling is possible in printer 1500. If scaling is possible in printer 1500, the font is classified into printer outline data (10), and the process returns to step (1).

On the other hand, if the decision in the step (5) is NO, whether the searched data is the outline font or not is determined (6), and if the decision is YES, the data is separated to the host computer scaling for the rasterization by the host computer 100 (11), and the process returns to the step (1). If the decision is NO, the searched data is classified to the bit map data (7) and the process returns to the step (1).

The font data in the print job is classified into one of the following five types by a flow chart of FIG. 7.

The font data classified to the bit map code in the step (8) has the bit map font data in the printer 1500. The character codes and the attributes are sent from the data analyzer 102 to the printer 1500 and they are processed by the rasterizer 202 (paths B-J-K).

The font data classified to the outline code in the step (9) has the outline font data in the printer 1500. Thus, the character codes and the attributes are sent from the data analyzer 102 to the printer 1500 and they are converted to the bit map font data by the font rasterizer on the printer 1500 and processed by the rasterizer 202 (paths B-J-K-M-N), or they are converted to the bit map font data by the font rasterizer 104 on the host computer 100 and the converted bit map font data is sent to the printer 1500 and processed by the rasterizer 202 (paths C-H-J-K).

The font data classified to the outline data in the step (10) has the font rasterizer 203 on the printer 1500 but does not have the outline font data. Thus, the character codes and the attributes are delivered from the data analyzer 102 to the font 103 and the corresponding outline font data is sent to the printer 1500, and they are converted to the bit map font data by the font rasterizer 203 on the printer 1500 and processed by the rasterizer 202 (paths D-G-K-M), or they are converted to the bit map font data by the font rasterizer 104 on the host computer 100 and the converted bit map font data is sent to the printer 1500 and processed by the rasterizer 202 (paths C-H-J-K).

The font data classified to the host scaling in the step (11) does not have the font rasterizer in the printer 1500. Accordingly, the font data is converted to the bit map data by the font rasterizer 104 on the host computer 100 and the converted bit map data is sent to the printer 1500 and processed by the rasterizer (paths C-H-J-K).

The font data classified to the bit map data in the step (7) does not have the bit map font data in the printer 1500. Accordingly, the bit map font data on the host computer 100 is sent to the printer 1500 and processed by the rasterizer 202.

When the font rasterization of the outline font is to be shared, the font data classified to the host scaling (step (11)) of the five types of the classified font data is font-rasterized by the host computer 100, and the font data classified to the outline code (step (9)) and the outline data (step (10)) are font-rasterized by the host computer 100 or the printer 1500 in accordance with the font rasterization resource (capability) of the host computer 100 and the printer 1500.

Figure 8:
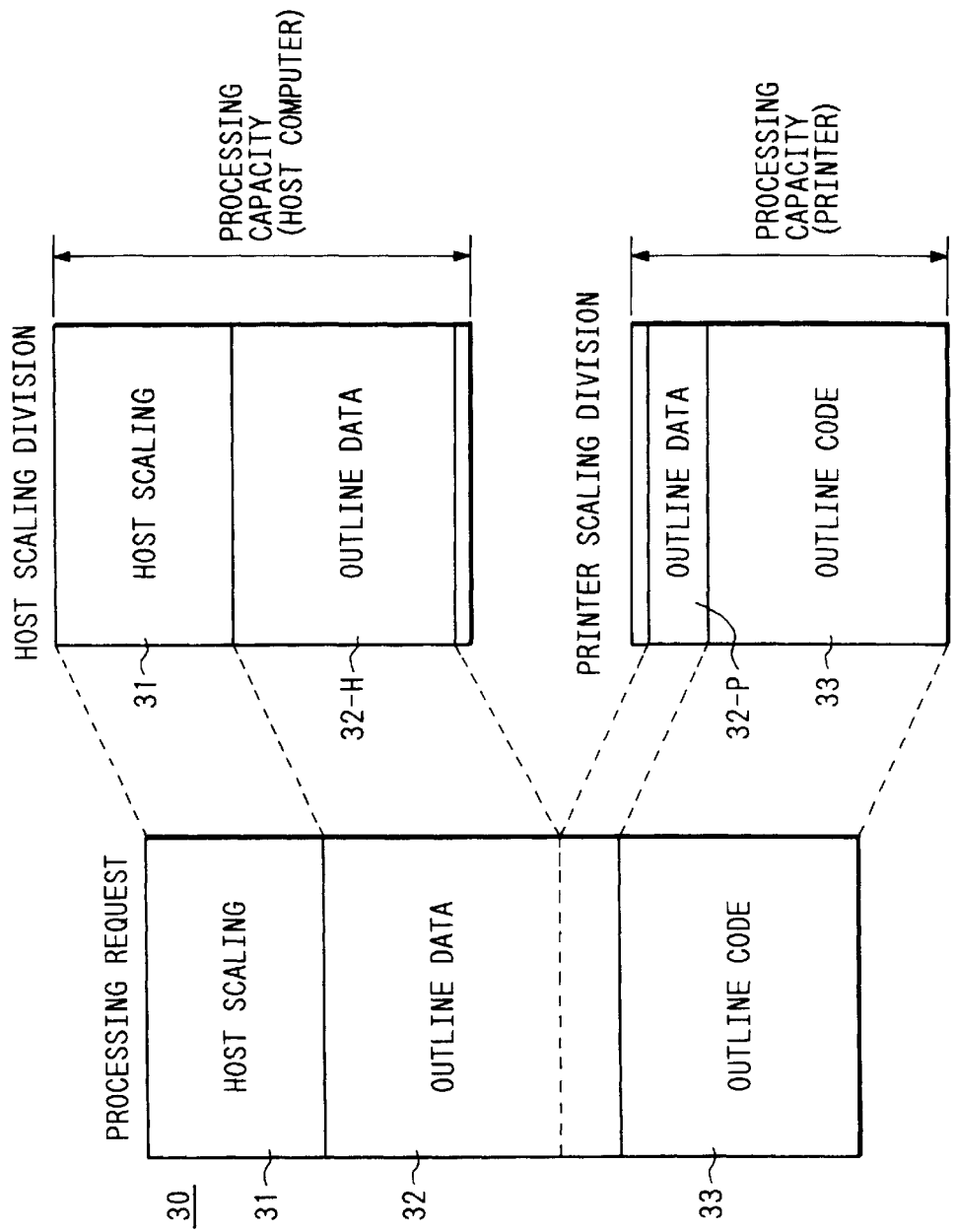
FIG. 8 shows a ratio of share of rasterization of the printer and the host computer.

FIG. 8 shows a diagram of a ratio of share of the rasterization of the printer 1500 and the host computer 100 shown in FIG. 4. It shows a share status of the rasterization when the printer 1500 has the rasterizer 202 which can process the rasterized data and the font rasterizer 203 which can execute the font rasterization in accordance with the outline font data.

In FIG. 8, numeral 30 denotes a font rasterization process in the print job, which comprises host computer scaling 31 which the host computer 100 scales, outline data 32 (including graphics and font) which the printer 1500 can rasterize, and outline code 33.

In the status shown in FIG. 8, the outline data 32 is divided to outline data 32-H which is processed by the host computer 100 and outline data 32-P which is processed by the printer 1500, and the outline code 33 is directly processed by the font rasterizer 203 of the printer 1500.

In the font rasterization 30 in the print job, the host scaling 31 is first processed and the remaining outline data 32 and the outline code 33 are divided into the host scaling process and the printer scaling process including the host scaling 31 in accordance with the host processing capability and the printer processing capability.

In FIG. 8, the outline data is divided. When the outline data 32 is small in amount and the outline code 33 is large, the outline code may be divided.

Where the font rasterizer 203 which can process the outline font data on the host computer 100 is not provided in the printer 1500, the font information is classified to the host scaling 31 and the outline code 33, and when there is no outline font data in the printer 1500 and the font rasterizer 203 which can process the outline font data on the host computer 100 is provided, the font data is classified to the host scaling 31 and the outline data 32. In any case, it is divided to the host scaling process and the printer scaling process including the host scaling 31 in accordance with the host processing capability and the printer processing capability.

In this manner, the host computer 100 acquires the resource data of the printer 1500 and dynamically determines the ratio of share of the rasterization for each printer job so that the share of the data processing of the host computer 100 and the printer 1500 is rendered uniform and the time from the input of the print command to the start of the sheet feed from the printer 1500 is shortened.

In the present embodiment, the font rasterization of the outline font is shared by the host computer and the printer although the rasterization of other than font such as the rasterization of the vector graphics or the expansion and the compaction of the bit image may also be shared.

In the present embodiment, the timing to acquire the resource data (for example, the table data) is not referred although the host computer 100 may store the resource data in the hard disk 11 as a temporary file at a timing communicatable with the printer 1500, or the resource data may be read from the printer 1500 at the time of the print command and stored as a temporary file, or it may be previously stored in the HD 11 of the host computer 100.

In the present embodiment, the host computer acquires the resource data of the printer, analyzes the print job based on the resource data, and determines the ratio of share of the rasterization of the printer and the host computer to the rasterization information of the print job, and the host computer and/or the printer parallelly rasterize the information extracted from the print job in accordance with the determined ratio of share of the rasterization so that the share of the rasterization of the printer and the host computer is rendered uniform.

Further, the rasterization information including the font data and the vector graphics data is parallelly rasterized by the host computer and/or the printer so that the share of the rasterization of the host computer and the printer is rendered uniform.

The host computer acquires the resource data of the printer, and when the print job is generated, it analyzes the print job based on the resource data of the printer to dynamically determine the ratio of share of the parallel processing of the first rasterizer and the second rasterizer, and the second rasterizer or the first rasterizer parallelly share the rasterization of the information in accordance with the determined ratio of share of the parallel processing so that the print job is efficiently processed while the share of the data processing of the printer and the host computer is rendered uniform.

Since the rasterization information including the font data and the vector graphics data is parallelly processed in a shared manner, the print job is efficiently processed while the share of the data processing of the printer and the host computer is rendered uniform.

Since the font size in the print job is analyzed based on the resource data of the printer to dynamically determine the ratio of share of the parallel processing of the first rasterizer and the second rasterizer, the rasterization of the specific types of font can be functionally shared by the host computer and the printer.

Further, since the amount of outline interpolation information in the print job is analyzed based on the resource data of the printer to dynamically determine the ratio of share of the parallel processing of the first rasterizer and the second rasterizer, the rasterization process corresponding to the number of interpolations in the outline information can be functionally shared by the host computer and the printer.

What is claimed is:

1. An information processing apparatus which outputs print data to a printer for processing as a job, said information processing apparatus comprising:

obtaining means for obtaining information indicating data processing features of the printer for the job, wherein the data processing features for the job include a time factor based on the time required for the printer to rasterize the print data of the job; and control means for controlling print data processing means to process the print data by distributing the print data to a process which transmits print data to the printer to be rasterized in the printer and a process which rasterizes print data in said information processing apparatus and transmits the rasterized print data to the printer, wherein the distribution depends on the data processing features of the printer indicated by the information obtained by said obtaining means, and wherein said control means determines a processing sharing ratio of the print data between said information processing apparatus and the printer on the basis of the data processing features of the printer, and wherein the processing sharing ratio is variable for different print data.

2. An information processing apparatus according to claim 1, wherein said information processing apparatus comprises a host computer.

3. An information processing apparatus according to claim 1, wherein the print data processing means comprises a rasterizer.

4. An information processing apparatus according to claim 1, wherein when the printer has no rasterizer, said control means controls a rasterizer provided in said information processing apparatus to process the print data to form bit map data and outputs the bit map data to the printer.

5. An information processing apparatus according to claim 1, wherein when the printer has a rasterizer, said control means controls the rasterizer to process the print data received from said information processing apparatus.

6. An information processing apparatus according to claim 1, wherein the print data comprises a character code.

7. An information processing apparatus according to claim 1, wherein when the printer has a rasterizer, said control means controls the rasterizer of the printer and a rasterizer provided in said information processing apparatus to process the print data in cooperation with each other depending on the data processing features of the printer.

8. An information processing apparatus according to claim 1, wherein said obtaining means obtains the information via a bidirectional interface.

9. An information processing apparatus which outputs print data to a printer having a first rasterizer having first data processing features, said information processing apparatus comprising:
    obtaining means for obtaining information indicating the first data processing features of the first rasterizer of the printer;
    a second rasterizer having second data processing features; and
    control means for controlling rasterization of the print data by both the first rasterizer and said second rasterizer by distributing the print data to a process which transmits a part of the print data to the printer for rasterization by the first rasterizer and printout of the rasterized print data by the printer, and a process which rasterizes the remainder of the print data in said second rasterizer and transmits the rasterized print data to the printer for printout,
    wherein the distribution depends on the first data processing features and the second data processing features, and
    wherein said control means determines a processing sharing ratio of the print data between the first rasterizer of the printer and said second rasterizer on the basis of the first data processing features of the first rasterizer of the printer, and wherein the processing sharing ratio is variable for different print data.

10. A storage medium used in an information processing apparatus which outputs print data to a printer for processing as a job, said storage medium having stored thereon a program for executing a process comprising the steps of:
    obtaining information indicating data processing features of the printer for the job, wherein the data processing features for the job include a time factor based on the time required for the printer to rasterize the print data of the job; and
    controlling a print data processor to process the print data by distributing the print data to a process which transmits print data to the printer to be rasterized in the printer and a process which rasterizes print data in the information processing apparatus and transmits the rasterized print data to the printer,
    wherein the distribution depends on the data processing features of the printer indicated by the obtained information, and
    wherein a processing sharing ratio of the print data between the information processing apparatus and the printer on the basis of the data processing features of the printer is determined in said controlling step, and wherein the processing sharing ratio is variable for different print data.

11. A storage medium according to claim 10, wherein the information processing apparatus comprises a host computer.

12. A storage medium according to claim 10, wherein the print data processor comprises a rasterizer.

13. A storage medium according to claim 10, wherein when the printer has no rasterizer, the program controls a rasterizer provided in the information processing apparatus to process the print data to form bit map data and outputs the bit map data to the printer.

14. A storage medium according to claim 10, wherein when the printer has a rasterizer, the program controls the rasterizer to process the print data received from the information processing apparatus.

15. A storage medium according to claim 10, wherein the print data comprises a character code.

16. A storage medium according to claim 10, wherein when the printer has a rasterizer, the program controls the rasterizer of the printer and a rasterizer provided in the information processing apparatus to process the print data in cooperation with each other depending on the data processing features of the printer.

17. A storage medium used in an information processing apparatus which outputs print data to a printer having a first, rasterizer having first data processing features, the information processing apparatus having a second rasterizer having second data processing features, said storage medium having stored thereon a program for executing a process comprising the steps of:
    obtaining information indicating the first data processing features of the first rasterizer of the printer; and
    controlling rasterization of the print data by both the first rasterizer and the second rasterizer by distributing the print data to a process which transmits a part of the print data to the printer for rasterization by the first rasterizer and printout of the rasterized print data by the printer, and a process which rasterizes the remainder of the print data in the second rasterizer and transmits the rasterized print data to the printer for printout,
    wherein the distribution depends on the first data processing features and the second data processing features, and
    wherein a processing sharing ratio of the print data between the first rasterizer of the printer and the second rasterizer on the basis of the data processing features of the first rasterizer of the printer is determined in said controlling step, and wherein the processing sharing ratio is variable for different print data.

18. A storage medium according to claim 10, wherein the program obtains the information via a bidirectional interface.

19. A storage medium according to claim 10, wherein said storage medium is detachably connected to the information processing apparatus.

20. A storage medium according to claim 19, wherein said storage medium comprises a floppy disk.

21. An information processing apparatus which outputs print data to a printer for processing as a job, said information processing apparatus comprising:
    a memory for storing information indicating data processing features of the printer for the job, wherein the data processing features for the job include a time factor based on the time required for the printer to rasterize the print data of the job; and
    a central processing unit for controlling the processing of the print data by distributing the print data to a process which transmits print data to the printer to be rasterized in the printer and a process which rasterizes print data in said information processing apparatus and transmits the rasterized print data to the printer,
    wherein the distribution depends on the data processing features of the printer indicated by the information stored in the memory, and wherein said central processing unit determines a processing sharing ratio of the print data between said information processing apparatus and the printer on the basis of the data processing features of the printer, and wherein the processing sharing ratio is variable for different print data.

22. An information processing apparatus according to claim 21, wherein said information processing apparatus comprises a host computer.

23. An information processing apparatus according to claim 21, wherein when the printer has no rasterizer, said central processing unit controls a rasterizer provided in said information processing apparatus to process the print data to form bit map data and outputs the bit map data to the printer.

24. An information processing apparatus according to claim 21, wherein when the printer has a rasterizer, said central processing unit controls the rasterizer to process the print data received from said information processing apparatus.

25. An information processing apparatus according to claim 21, wherein the print data comprises a character code.

26. An information processing apparatus according to claim 21, wherein when the printer has a rasterizer, said central processing unit controls the rasterizer of the printer and a rasterizer provided in said information processing apparatus to process the print data in cooperation with each other depending on the data processing features of the printer.

27. An information processing apparatus according to claim 21, wherein the data processing features of the printer are obtained from the printer via a bidirectional interface and stored in said memory.

28. An information processing apparatus which outputs print data to a printer having a first rasterizer having first data processing features, said information processing apparatus comprising:
 a memory for storing information indicating the first data processing features of the printer;
 a second rasterizer having second data processing features; and
 a central processing unit for controlling rasterization of the print data by both the first rasterizer and said second rasterizer by distributing the print data to a process which transmits a part of the print data to the printer for rasterization by the first rasterizer and printout of the rasterized print data by the printer, and a process which rasterizes the remainder of the print data in said second rasterizer and transmits the rasterized print data to the printer for printout,
 wherein the distribution depends on the first data processing features indicated by the information stored in the memory and the second data processing features, and
 wherein said central processing unit determines a processing sharing ratio of the print data between the first rasterizer of the printer and said second rasterizer on the basis of the first data processing features of the printer and the second data processing features and wherein the processing sharing ratio is variable for different print data.

29. A printer for processing print data received from an information processing apparatus, said printer comprising:
 informing means for informing the information processing apparatus of data processing features of said printer in response to an inquiry from the information processing apparatus, wherein the data processing features include a time required for said printer to rasterize print data of the job; and
 control means for controlling data processing means to execute data processing determined by the information processing apparatus depending on the data processing features of the printer informed by said informing means and
 wherein the information processing apparatus determines a processing sharing ratio of the print data between the information processing apparatus and said printer on the basis of the data processing features of said printer, and wherein the processing sharing ratio is variable for different print data.

30. A printer according to claim 29, wherein the information processing apparatus comprises a host computer.

31. A printer according to claim 29, wherein the has processing features of said printer include whether said printer hits a rasterizer which rasterizes the print data received from the information processing apparatus.

32. A printer according to claim 29, wherein the data processing features of said printer include a time required to rasterize the print data received from the information processing apparatus.

33. A printer according to claim 29, wherein the data processing means comprises a rasterizer.

34. A printer according to claim 29, wherein the data processing determined by the information processing apparatus comprises processing a character code received from the information processing apparatus with a rasterizer.

35. A printer according to claim 29, wherein the data processing determined by the information processing apparatus comprises processing bit map data received from the information processing apparatus with a rasterizer.

36. A printer according to claim 29, wherein said informing means informs the information processing apparatus of the data processing features via a bidirectional interface.

37. A printer for processing print data received from an information processing apparatus as a job, said printer comprising:
 information means for informing the information processing apparatus of data processing features of said printer in response to an inquiry from the information processing apparatus, wherein the data processing features for the job include a time factor based on the time required for said printer to rasterize the print data of the job; and
 control means for controlling data processing means to execute data processing determined by the information processing apparatus depending on the data processing features informed by said informing means, and
 wherein the information processing apparatus determines a processing sharing ratio of the print data between the information processing apparatus and said printer on the basis of the data processing features of said printer, and wherein the processing sharing ratio is variable for different print data.

38. A printer according to claim 37, wherein the information processing apparatus comprises a host computer.

39. A printer according to claim 37, wherein the data processing determined by the information processing apparatus comprises processing a character code received from the information processing apparatus with a rasterizer.

40. A printer according to claim 37, wherein the data processing determined by the information processing apparatus comprises bit map data received from the information processing apparatus with a rasterizer.

41. An information processing apparatus which outputs print data to a printer for processing as a job, said information processing apparatus comprising:
 obtaining means for obtaining information indicating data processing features of the printer for the job, wherein the data processing features for the job include the time required for the printer to rasterize the print data of the job; and control means for controlling print data processing means to process the print data by distributing the print data to a process which transmits print data to the printer to be rasterized in the printer and a process which rasterizes print data in said information processing apparatus and transmits the rasterized print data to the printer, wherein the distribution depends on the data processing features of the printer indicated by the information obtained by said obtaining means, and wherein said control means determines a processing sharing ratio of the print data between said information processing apparatus and the printer on the basis of the data processing features of the printer, and wherein the processing sharing ratio is variable for different print data.

42. A storage medium used in an information processing apparatus which outputs print data to a printer for processing as a job, said storage medium having stored thereon a program for executing a process comprising the steps of:

obtaining information indicating data processing features of the printer for the job, wherein the data processing features for the job include the time required for the printer to rasterize the print data of the job; and controlling a print data processor to process the print data by distributing the print data to a process which transmits print data to the printer to be rasterized in the printer and a process which rasterizes print data in the information processing apparatus and transmits the rasterized print data to the printer, wherein the distribution depends on the data processing features of the printer indicated by the obtained information, and wherein a processing sharing ratio of the print data between information processing apparatus and the printer on the basis of the data processing features of the printer is determined in said controlling step, and wherein the processing sharing ratio is variable for different print data.

43. An information processing apparatus which outputs print data to a printer for processing as a job, said information processing apparatus comprising:

a memory for storing information indicating data processing features of the printer for the job, wherein the data processing features for the job include the time required for the printer to rasterize the print data of the job; and a central processing unit for controlling a rasterizer to process the print data by distributing the print data to a process which transmits print data to the printer to be rasterized in the printer and a process which rasterizes print data in said information processing apparatus and transmits the rasterized print data to the printer, wherein the distribution depends on the data processing features of printer indicated by the information stored in the memory, and wherein said central processing unit determines a processing sharing ratio of the print data between said information processing apparatus and the printer on the basis of the data processing features of the printer, and wherein the processing sharing ratio is variable for different print data.

* * * * *

UNITED STATES PATENT AND TRADEMARK OFFICE
CERTIFICATE OF CORRECTION

PATENT NO.    : 6,750,980 B1
DATED         : June 15, 2004
INVENTOR(S)   : Akihiro Shimura et al.

It is certified that error appears in the above-identified patent and that said Letters Patent is hereby corrected as shown below:

Title page,
Item [76] Inventors, "Akihiro Shimura, c/o Canon Kabushiki Kaisha 30-2, 3-chome, Shimomaruko, Ohta-ku, Tokyo (JP); Satoshi Nagata, c/o Canon Kabushiki Kaisha 30-2, 3-chome, Shimomaruko, Ohtaku, Tokyo (JP); Yoshifumi Okamoto, c/o Canon Kabushiki Kaisha 30-2, 3-chome, Shimomaruko, Ohta-ku, Tokyo (JP); Tetsuya Morita, c/o Canon Kabushiki Kaisha 30-2, 3-chome, Shimomaruko, Ohta-ku, Tokyo (JP); Shunya Mitsuhashi, c/o Canon Kabushiki Kaisha 30-2, 3-chome, Shimomaruko, Ohtaku, Tokyo (JP); Nobuhiko Sato, c/o Canon Kabushiki Kaisha 30-2, 3-chome, Shimomaruko, Ohta-ku, Tokyo (JP); Takanori Nishijima, c/o Canon Kabushiki Kaisha 30-2, 3-chome, Shimomaruko, Ohta-ku, Tokyo (JP); Masaki Unishi, c/o Canon Kabushiki Kaisha 30-2, 3-chome, Shimomaruko, Ohta-ku, Tokyo (JP)"
should read -- Akihiro Shimura, Tokyo (JP); Satoshi Nagata, Tokyo (JP); Yoshifumi Okamoto, Yokohama (JP); Tetsuya Morita, Kawasaki (JP); Shunya Mitsuhashi, Tokyo (JP); Nobuhiko Sato, Yokohama (JP); Takanori Nishijima, Tokyo (JP); Masaki Unishi, Tokyo (JP)--;
"(73) Assignee:" has been omitted, and should read -- [73] Canon Kabushiki Kaisha, Tokyo, (JP)--; and
Item [56], References Cited, FOREIGN PATENT DOCUMENTS, "EP 427466 5/1991" should be deleted as duplicative.

Column 2,
Line 50, "other" should read -- another --; and
Line 59, "record,sheet" should read -- record sheet --.

Column 5,
Line 31, "of,share" should read -- of share --; and
Line 62, "bezie" should read -- Bezier--.

Column 12,
Line 18, "first," should read -- first --.

UNITED STATES PATENT AND TRADEMARK OFFICE
CERTIFICATE OF CORRECTION

PATENT NO.    : 6,750,980 B1
DATED         : June 15, 2004
INVENTOR(S)   : Akihiro Shimura et al.

It is certified that error appears in the above-identified patent and that said Letters Patent is hereby corrected as shown below:

Column 14,
Line 13, "has" should read -- data --; and
Line 15, "hits" should read -- has --.

Signed and Sealed this

Third Day of May, 2005

JON W. DUDAS
*Director of the United States Patent and Trademark Office*